United States Patent [19]

Rempel et al.

[11] Patent Number: 5,561,197
[45] Date of Patent: Oct. 1, 1996

[54] HYDROGENATION OF DIENE COPOLYMERS

[75] Inventors: Garry L. Rempel, Waterloo; Neil T. McManus, Kitchener; John S. Parent, Waterloo, all of Canada

[73] Assignee: University of Waterloo, Ontario, Canada

[21] Appl. No.: 496,119

[22] Filed: Jun. 27, 1995

[51] Int. Cl.$^6$ ................................................ C08F 8/04
[52] U.S. Cl. .................. 525/338; 525/332.8; 525/332.9; 525/333.1; 525/333.2
[58] Field of Search ............................................... 525/338

[56] References Cited

U.S. PATENT DOCUMENTS

| | | | |
|---|---|---|---|
| 3,454,644 | 7/1969 | Dewhurst | 260/570.9 |
| 4,746,707 | 5/1988 | Fiedler et al. | 525/338 |
| 4,978,721 | 12/1990 | Fiedler et al. | 525/338 |

OTHER PUBLICATIONS

A. Andriollo et al., J.A.C.S. 1989 vol. III, pp. 7431–7437. (Month Unavailable).
M. A. Esteruelas et al., J. Molecular Catalysis 1989 vol. 53, pp. 43–52. (Month Unavailable).
F. G. Moers et al., 91 (1972) RECUEIL, pp. 591–600. (Month Unavailable).
M. A. Esteruelas et al., J. Organomet. Chem. 303 (1986) pp. 221–231. (Month Unavailable).
M. A. Esteruelas et al., J. Mol. Cat. (1988), 45, pp. 1–5. (Month Unavailable).
M. A. Esteruelas et al., Organometallics 1992, 11, 3362–3369. (Month Unavailable).
M. A. Esteruelas et al., Angew. Chem. Int. Ed. Engl. 27 (1988) No. 11, p. 1563. (Month Unavailable).
H. Werner et al., Organometallics 1986, 5, 2295–2299. (Month Unavailable).
H. Werner et al., Chem. Ber. 120, 11–15 (1987). (Month Unavailable).

*Primary Examiner*—Bernard Lipman
*Attorney, Agent, or Firm*—Joseph C. Gil; Godfried R. Akorli

[57] ABSTRACT

A process is provided for the hydrogenation of carbon-carbon double bonds in polymers by treatment of the polymer in solution with hydrogen in the presence of osmium-based catalysts.

16 Claims, No Drawings

HYDROGENATION OF DIENE COPOLYMERS

FIELD OF THE INVENTION

The present invention relates to a process for the hydrogenation of carbon-carbon double bonds in polymers.

BACKGROUND OF THE INVENTION

It is known that carbon-carbon double bonds in polymers may be hydrogenated by treating the polymer with hydrogen in the presence of a catalyst. Such processes can be selective in the double bonds which are hydrogenated so that, for example, the double bonds in aromatic or naphthenic groups are not hydrogenated and double or triple bonds between carbon and other atoms such as nitrogen or oxygen are not affected. This art field contains many examples of catalysts suitable for such hydrogenations, including catalysts based on cobalt, nickel, rhodium and ruthenium. The suitability of the catalyst depends on the extent of hydrogenation required, the rate of the hydrogenation reaction and the presence or absence of other groups, such as carboxyl and nitrile groups, in the polymer. Another factor to be considered is the cost, availability and quantity required of the catalyst.

U.S. Pat. No. 3,454,644 teaches the hydrogenation of unsaturated organic compounds having from 2 to 20 carbon atoms which organic compounds contain at least one moiety selected from keto, formyl, nitrile, nonaromatic carbon double bonds and carbon-carbon triple bonds, by using as the catalyst a metal complex of ruthenium or osmium bonded to two electro negative species selected from hydrogen and halogen and complexed with at least two organic stabilizing ligands such as carbonyl or tertiary phosphine.

A. Andriollo et al in J.A.C.S. 1989 Volume 111 pages 7431–7437 describe the use of the osmium complexes $OsHCl(CO)(PR_3)_2$, where $PR_3$ is P-(isopropyl)$_3$ or P methyl(tertiarybutyl)$_2$, for the catalytic sequential hydrogenation of phenylacetylene. M. A. Esteruelas et al in J. Molecular Catalysis 1989 Vol. 53 pages 43–52 describe the reduction of unsaturated ketones catalyzed by $OsHCl(CO)(PR_3)_2$ where R is isopropyl.

The present invention is directed to a process wherein the rate of hydrogenation is high, the hydrogenation reaction is not affected by the presence or absence in the polymer of other groups such as aromatic, naphthenic, carboxyl or nitrile groups and the extent of hydrogenation is high.

SUMMARY OF THE INVENTION

The present invention provides a process for the hydrogenation of carbon-carbon double bonds in polymers to produce a hydrogenated polymer, said polymer comprising a conjugated diolefin and at least one other copolymerizable monomer, which process comprises hydrogenating a solution of said polymer at a temperature of from about 100° to about 180° C. and a hydrogen pressure of from about 0.7 to about 15.5 MPa in the presence of a catalyst having the formula

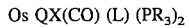

Os QX(CO) (L) (PR$_3$)$_2$ wherein Q may be one of hydrogen and a phenylvinyl group, X may be one of halogen, tetrahydroborate and alkyl- or aryl-carboxylate, L may be one of an oxygen molecule, benzonitrile or no ligand, and R may be one of cyclohexyl, isopropyl, secondary butyl and tertiary butyl, said tertiary butyl being present only when one R is methyl, with the proviso that when Q is phenylvinyl X is halogen and L is no ligand, and when X is alkyl- or aryl-carboxylate or tetrahydroborate Q is hydrogen and L is no ligand, said halogen being selected from chlorine and bromine.

DETAILED DESCRIPTION

The polymers which may be hydrogenated in the present process are polymers which contain carbon-carbon double bonds and accordingly comprise a conjugated diolefin and at least one other copolymerizable monomer. The conjugated diolefin is selected from butadiene, isoprene, piperylene and 2,3-dimethylbutadiene, with butadiene and isoprene being preferred and butadiene being most preferred. The at least one other copolymerizable monomer is selected from acrylonitrile, methacrylonitrile, styrene, alphamethyl styrene, propyl acrylate, butyl acrylate, propyl methacrylate, butyl methacrylate, and unsaturated carboxylic acids selected from fumaric acid, maleic acid, acrylic acid and methacrylic acid. Generally, the conjugated diolefin forms from about 40 to about 85 weight per cent of the polymer. If the other copolymerizable monomer is selected from styrene and alphamethyl styrene, it forms from about 15 to about 60 weight per cent of the polymer. If the other copolymerizable monomer is selected from acrylonitrile and methacrylonitrile, it forms from about 15 to about 50 weight per cent of the polymer, with the conjugated diolefin forming from about 50 to about 85 weight per cent of the polymer. If the other copolymerizable monomer is selected from acrylonitrile and methacrylonitrile and additionally from an unsaturated carboxylic acid, the acrylonitrile or methacrylonitrile forms from about 15 to about 50 weight per cent of the polymer, the unsaturated carboxylic acid forms from about 1 to about 10 weight per cent of the polymer and the conjugated diolefin forms from about 40 to about 84 weight per cent of the polymer. Preferred polymers include styrene-butadiene polymers of the random or block types, butadiene-acrylonitrile polymers and butadiene-acrylonitrile-methacrylic acid polymers. Preferred butadiene-acrylonitrile polymers have an acrylonitrile content of from about 25 to about 45 weight per cent. The polymers are high molecular weight materials and have molecular weights, as expressed by the Mooney viscosity (ML1+4 at 100° C.), of from about 25 to about 70. A polymer having a Mooney viscosity of about 34 has an intrinsic viscosity, determined in chlorobenzene at 35° C., of about 1.1 dL/g.

The hydrogenation of the polymer is undertaken in solution. Suitable solvents for the polymer and the hydrogenation process include benzene, toluene, xylene, monochlorobenzene and tetrahydrofuran, with monochlorobenzene and tetrahydrofuran being preferred and monochlorobenzene being most preferred. The concentration of the polymer in the solvent may be from about 2 to about 15 weight per cent, preferably from about 8 to about 12 weight per cent.

The hydrogen is used as an essentially pure gas at a pressure of from about 0.7 to about 15.5 MPa, preferably at a pressure of from about 3.5 to about 10.5 MPa.

The hydrogenation reaction is undertaken in a suitable reactor equipped with temperature regulating and agitating means. Polymer solution is fed into the reactors degassed as necessary, the catalyst is added either as a pure material or preferably in solution and the reactor is pressurized with hydrogen or, in the alternative, the reactor is pressurized with hydrogen and the catalyst is added either as a pure material or preferably in solution. Generally, it is preferred to heat the reactor and the polymer solution before the catalyst is added. The hydrogenation temperature is from about 100° to about 180° C., preferably from about 120° to about 160° C. During the course of the hydrogenation reaction, hydrogen may be added to the reactor. The reaction time is from about one quarter of an hour to about twenty four hours, preferably from about one half of an hour to about eight hours. The extent to which the carbon-carbon double bonds in the polymer are hydrogenated, that is to say the degree of hydrogenation, is from about 80 to about 99.5 per cent, preferably from about 90 to about 99 per cent.

It has been found that the presence of a small amount of water in the reaction system does not affect the hydrogenation reaction and may lead to a slight reduction in the molecular weight of the hydrogenated product. Water may be present as a result of a very small amount still associated with the polymer to be hydrogenated or it may be added to the solution of the polymer. The quantity of water present may be up to about 10 weight per cent based on the polymer. It has been found that having water present as an additive in amounts up to 8 weight per cent at high polymer loading leads to lower polymer viscosities. It has also been found that higher loading of water, particularly above about 10%, may require higher reaction time.

When the hydrogenation reaction is complete to the extent desired, the reaction vessel is cooled and vented and the hydrogenated polymer is recovered by contact with hot water/steam or alcohol and dried.

The osmium catalyst used in the present process has the formula

Os QX(CO) (L) (PR$_3$)$_2$ in which Q may be one of hydrogen and a phenylvinyl group, X may be one of halogen, tetrahydroborate and alkyl- or aryl-carboxylate, L may be one of an oxygen molecule, benzonitrile or no ligand, and R may be one of cyclohexyl, isopropyl, secondary butyl and tertiary butyl said tertiary butyl being present only when one R is methyl, with the proviso that when Q is phenylvinyl X is halogen and L is no ligand and when X is alkyl- or aryl-carboxylate Q is hydrogen and L is no ligand, said halogen being selected from chlorine and bromine. Preferably, Q is hydrogen, X is selected from chlorine, tetrahydroborate and acetate, L is an oxygen molecule or no ligand and R is cyclohexyl or isopropyl. Additional alkyl- or aryl-carboxylates include chloroacetate and benzoate.

Examples of suitable osmium catalysts include OsHCl(CO)[P(cyclohexyl)$_3$]$_2$, OsHCl(CO)[P(isopropyl)$_3$]$_2$, OsHCl(O$_2$)(CO)[P(cyclohexyl)$_3$]$_2$, OsHCl(O$_2$)(CO)[P(isopropyl)$_3$]$_2$, Os(CH=CH-C$_6$H$_5$) Cl(CO)[P(cyclohexyl)$_3$]$_2$, Os(CH=CH-C$_6$H$_5$) Cl(CO)[P(isopropyl)$_3$]$_2$, OsH(BH$_4$) (CO)[P(cyclohexyl)$_3$]$_2$, OsH(BH$_4$) (CO)[P(isopropyl)$_3$]$_2$, OsH(CH$_3$COO) (CO)[P(cyclohexyl)$_3$]$_2$, OsH(CH$_3$COO) (CO)[P(isopropyl)$_3$]$_2$, OsHCl(CO) (C$_6$H$_5$CN) [P(cyclohexyl)$_3$]$_2$, and OsHCl(CO) (C$_6$H$_5$CN) [P(isopropyl)$_3$]$_2$. Preferred catalysts are OsHCl (CO) [P(cyclohexyl)$_3$]$_2$, OsHCl(CO) [P(isopropyl)$_3$]$_2$, OsHCl(O$_2$) (CO) [P(cyclohexyl)$_3$]$_2$ and OsHCl (O$_2$) (CO) P(isopropyl)$_3$]$_2$.

The quantity of the osmium catalyst required for the hydrogenation process is from about 0.01 to about 0.2 weight per cent based on the polymer and preferably from about 0.02 to about 0.1 weight per cent based on the polymer.

The following examples illustrate the scope of the invention and are not intended to limit the same.

EXAMPLES

Example 1

A 300 ml glass lined stainless steel autoclave having temperature control means, an agitator and solution and hydrogen gas addition points was used. A butadiene-acrylonitrile polymer which had a bound acrylonitrile content of about 38 weight per cent and a Mooney viscosity (ML1+4 at 100° C.) of about 50 was used as a solution in monochlorobenzene. The catalyst used is identified in Table I as Catalyst Type I, which was OsHCl(CO)[P(cyclohexyl)$_3$]$_2$, or Catalyst Type II, which was OsHCl(CO)[P(isopropyl)$_3$]$_2$. The details are provided in Table I and it is clear that high levels of hydrogenation can be achieved in relatively short reaction times. The degree of hydrogenation was determined by infra-red analysis of the hydrogenated polymer. The catalyst concentration is weight per cent based on the weight of polymer.

Example 2

Using the equipment and procedure described in Example 1, the same butadiene-acrylonitrile polymer was subjected to hydrogenation in the presence of Catalyst Type III which was Os(CH=CH-C$_6$H$_5$)Cl(CO)[P(cyclohexyl)$_3$]$_2$ or Catalyst Type I. The details and results are shown in Table II. The intrinsic viscosity was measured in monochlorobenzene at 35° C.

TABLE I

| Expt. # | Catalyst Type | Catalyst Conc. wt. % | Polymer Conc. wt. % | Reaction Temp. °C. | Hydrogen Pressure MPa | Reaction Time hours | Hydrogenation % |
|---|---|---|---|---|---|---|---|
| 1 | I | 0.25 | 2.4 | 130 | 2.07 | 1 | 99.3 |
| 2 | I | 0.20 | 3.1 | 120 | 4.14 | 1.5 | 99.5 |
| 3 | I | 0.06 | 9 | 140 | 4.14 | 2 | 99.1 |
| 4 | I | 0.03 | 11.7 | 140 | 8.28 | 3 | 99.1 |
| 5 | II | 0.12 | 3.1 | 120 | 4.14 | 4 | 99 |

TABLE II

| Expt. # | Catalyst Type | Catalyst Conc. wt. % | Polymer Conc. wt. % | Reaction Temp. °C. | Hydrogen Pressure MPa | Reaction Time hours | Hydrogenation % |
|---|---|---|---|---|---|---|---|
| 6 | III | 0.03 | 12 | 140 | 8.28 | 3 | 99.1 |
| 7 | III | 0.05 | 12 | 145 | 8.28 | 1.75 | 99.2 |
| 8 | I | 0.02 | 12 | 140 | 6.9 | 6 | 99.3 |

Intrinsic Viscosity (dL/g) Expt. #6, 1.68; Expt. #7, 1.76; Expt. #8, 1.56

Example 3

Using the equipment and procedure described in Example 1, a butadiene-acrylonitrile polymer having a bound acrylonitrile content of about 34 weight per cent and a Mooney viscosity (ML1+4 at 100° C.) of about 30 was hydrogenated in the presence of the catalysts identified in Table III. Catalyst IV was OsHCl(CO) (O$_2$) [P(cyclohexyl)$_3$]$_2$, Catalyst V was OsH(CH$_3$COO) (CO) [P(cyclohexyl)$_3$]$_2$, Catalyst VI was OsHCl (CO) (C$_6$H$_5$CN) [P(cyclohexyl)$_3$]$_2$, Catalyst VII was OsH(BH$_4$) (CO) [P(cyclohexyl)$_3$]$_2$ and Catalyst VIII was OsHCl(CO) (O$_2$) [P(isopropyl)$_3$]$_2$. The polymer concentration was 5 weight per cent in monochlorobenzene, the catalyst concentration was 0.1 weight per cent based on the weight of polymer except for Expt. #14 and 15 where it was 0.06 weight per cent based on the weight of polymer, the reaction temperature was 140° C. and the hydrogen pressure was 5.52 MPa.

Example 4

A polymer containing about 26 weight per cent of acrylonitrile, about 67.5 weight per cent of butadiene and about 6.5 weight per cent of methacrylic acid (identified as XNBR), a styrene-butadiene radial block copolymer containing about 70 weight per cent of butadiene and about 30 weight per cent of styrene and commercially available as SOLPRENE® 411 (identified as SBR) and a butadiene-acrylonitrile polymer containing about 34 weight per cent of bound acrylonitrile and having a Mooney viscosity (ML1+4 at 100° C.) of about 30 (identified as NBR) were hydrogenated in the presence of Catalyst I. For the XNBR and the SBR the polymers were used as 5 weight per cent solutions in monochlorobenzene and for the NBR the polymer was used as a 5 weight per cent solution in tetrahydrofuran. The reaction temperature was 140° C., the hydrogen pressure was 5.52 MPa and the catalyst concentration was 0.1 weight per cent with respect to the weight of polymer. The details are provided in Table IV—the extent of hydrogenation of the SBR was determined by NMR.

TABLE III

| Expt. # | Catalyst Type | Reaction Time hours | Hydrogenation % |
|---|---|---|---|
| 9 | I | 1.5 | 99.1 |
| 10 | IV | 2 | 99.1 |
| 11 | V | 1.5 | 99.6 |
| 12 | VI | 1.5 | 99.5 |
| 13 | VII | 1 | 99.3 |
| 14 | II | 1.5 | 99.4 |
| 15 | VIII | 2 | 99.3 |

TABLE IV

| Expt. # | Polymer | Reaction Time hours | Hydrogenation % |
|---|---|---|---|
| 16 | XNBR | 2.5 | 99 |
| 17 | SBR | 0.5 | 98.5 |
| 18 | NBR | 2 | 99.2 |

Example 5

A polymer containing about 34 weight per cent of acrylonitrile and about 66 weight per cent of butadiene and having a Mooney viscosity (ML1+4 at 100° C.) of about 34 and an intrinsic viscosity in monochlorobenzene measured at 35° C. of about 1.1 dL/g was used in the equipment and following the procedure described in Example 1. The concentration of polymer in monochlorobenzene was about 12 weight per cent, the hydrogen pressure used was about 8.3 MPa. The catalyst used was Catalyst IV. For Expts. #19, 20, 21 and 22, the catalyst is present in a concentration of about 0.024 weight per cent based on the polymer and in Expts. #23, 24, 25 and 26, the catalyst is present in a concentration of about 0.025 weight per cent based on the polymer. The solution of the catalyst in monochlorobenzene was prepared by one of two methods. In Method A, monochlorobenzene was degassed by the freeze-thaw method, the weighed amount of catalyst was added under nitrogen and after the catalyst was dissolved, the solution was transferred to a pressure vessel from which it was withdrawn for addition to the autoclave. In Method B, monochlorobenzene was degassed by the freeze-thaw method, transferred to a dry box, a weighed amount of catalyst was transferred to the dry box and added to the monochlorobenzene, after the catalyst was dissolved the required volume of solution was transferred to a pressure vessel and the pressure vessel containing the catalyst was removed from the dry box and was ready for use to provide catalyst solution to the autoclave. The details are provided in Table V.

TABLE V

| Expt. # | Temp (°C.) | Water Conc. (wt. %) | Reaction Time (hours) | Hydrogenation (%) | Intrinsic Viscosity (dL/g) |
|---|---|---|---|---|---|
| 19 | 145 | 0 | 4.5 | 99.5 | 1.69 |
| 20 | 145 | 5 | 6 | 99.4 | 1.55 |
| 21 | 155 | 0 | 2.7 | 99.6 | 1.78 |
| 22 | 155 | 5 | 2.7 | 98.7 | 1.62 |
| 23 | 150 | 0 | 3.5 | 99.6 | 1.81 |
| 24 | 150 | 2.7 | 4 | 99.4 | 1.67 |
| 25 | 150 | 5.4 | 3.75 | 99.3 | 1.63 |
| 26 | 150 | 8.1 | 4 | 99.3 | 1.56 |
| 27 | 150 | 10.8 | 5 | 99.5 | 1.57 |

We claim:

1. A process for the hydrogenation of carbon-carbon double bonds in polymers to produce a hydrogenated polymer, said polymer comprising a conjugated diolefin and at least one other copolymerizable monomer, which process comprises hydrogenating a solution of said polymer at a temperature of from about 100° to about 180° C. and a hydrogen pressure of from about 0.7 to about 15.5 MPa in the presence of a catalyst having the formula Os QX(CO) (L) )PR$_3$)$_2$ wherein Q may be one of hydrogen and a phenylvinyl group, X may be one of halogen, tetrahydroborate and alkyl- or aryl-carboxylate, L may be one of an oxygen molecule, benzonitrile or no ligand, and R may be one of cyclohexyl, isopropyl, secondary butyl and tertiary butyl, said tertiary butyl being present only when one R is methyl, with the proviso that when Q is phenylvinyl X is halogen and L is no ligand, and when X is alkyl- or arylcarboxylate Q is hydrogen and L is no ligand, said halogen being selected from chlorine and bromine.

2. The process of claim 1 wherein the conjugated diolefin is selected from butadiene and isoprene.

3. The process of claim 2 wherein the at least one other copolymerizable monomer is selected from styrene and alphamethyl styrene.

4. The process of claim 2 wherein the at least one other copolymerizable monomer is selected from acrylonitrile and methacrylonitrile.

5. The process of claim 2 wherein the at least one other copolymerizable monomer is acrylonitrile and an unsaturated carboxylic acid selected from fumaric acid, maleic acid, acrylic acid and methacrylic acid.

6. The process of claim 2 wherein the at least one other copolymerizable monomer is acrylonitrile and one of propyl acrylate, butyl acrylate, propyl methacrylate and butyl methacrylate.

7. The process of claim 1 wherein the polymer is a solution in a solvent selected from benzene, toluene, monochlorobenzene and tetrahydrofuran, the hydrogenation is at a temperature of from about 120° to about 160° C. and the hydrogen pressure is from about 3.5 to about 10.5 MPa.

8. The process of claim 1 wherein the catalyst is present at from about 0.01 to about 0.2 weight per cent based on the polymer.

9. The process of claim 8 wherein the catalyst is selected from the group consisting of $OsHCl(CO)[P(cyclohexyl)_3]_2$, $OsHCl(CO)[P(isopropyl)_3]_2$, $Os(CH=CH-C_6H_5)Cl(CO)[P(cyclohexyl)_3]_2$, $OS(CH=CH-C_6H_5)Cl(CO)[P(isopropyl)_3]_2$, $OsHCl(O_2)(CO)[P(cyclohexyl)_3]_2$, $OsHCl(O_2)(CO)[P(isopropyl)_3]_2$, $OsH(BH_4)(CO)[P(cyclohexyl)_3]_2$, $OsH(BH_4)(CO)[P(isopropyl)_3]_2$, $OsH(CH_3COO)(CO)[P(cyclohexyl)_3]_2$, $OsH(CH_3COO)(CO)[P(isopropyl)_3]_2$, $OsHCl(CO)(C_6H_5CN)[P(cyclohexyl)_3]_2$, and $OsHCl(CO)(C_6H_5CN)[P(isopropyl)_3]_2$.

10. The process of claim 4 wherein the polymer is in solution in a solvent selected from monochlorobenzene and tetrahydrofuran, the hydrogenation is at a temperature of from about 120° to about 160° C., the hydrogen pressure is from about 3.5 to about 10.5 MPa, the catalyst is present at from about 0.02 to about 0.1 weight per cent based on the polymer and the catalyst is selected from $OsHCl(CO)[P(cyclohexyl)_3]_2$, $OsHCl(CO)[P(isopropyl)_3]_2$, $OsHCl(O_2)(CO)[P(cyclohexyl)_3]_2$ and $OsHCl(O_2)(CO)[P(isopropyl)_3]_2$.

11. The process of claim 5 wherein the polymer is in solution in a solvent selected from monochlorobenzene and tetrahydrofuran, the hydrogenation is at a temperature of from about 120° to about 160° C., the hydrogen pressure is from about 3.5 to about 10.5 MPa, the catalyst is present at from about 0.02 to about 0.1 weight per cent based on the polymer and the catalyst is selected from $OsHCl(CO)[P(cyclohexyl)_3]_2$, $OsHCl(CO)[P(isopropyl)_3]_2$, $OsHCl(O_2)(CO)[P(cyclohexyl)_3]_2$ and $OsHCl(O_2)(CO)[P(isopropyl)_3]_2$.

12. The process of claim 6 wherein the polymer is in solution in a solvent selected from monochlorobenzene and tetrahydrofuran, the hydrogenation is at a temperature of from about 120° to about 160° C. the hydrogen pressure is from about 3.5 to about 10.5 MPa, the catalyst is present at from about 0.02 to about 1 weight per cent based on the polymer and the catalyst is selected from $OsHCl(CO)[P(cyclohexyl)_3]_2$, $OsHCl(CO)[P(isopropyl)_3]_2$, $OsHCl(O_2)(CO)[P(cyclohexyl)_3]_2$ and $OsHCl(O_2)(CO)[P(isopropyl)_3]_2$.

13. The process of claim 1 wherein water is present as an additive in an amount of about 2 to about 8 per cent by weight based on the polymer.

14. The process of claim 10 wherein water is present as an additive in an amount of about 2 to about 8 per cent by weight based on the polymer.

15. The process of claim 11 wherein water is present as an additive in an amount of about 2 to about 8 per cent by weight based on the polymer.

16. The process of claim 12 wherein water is present as an additive in an amount of about 2 to about 8 per cent by weight based on the polymer.

\* \* \* \* \*